United States Patent [19]
Zortea

[11] Patent Number: 5,376,962
[45] Date of Patent: Dec. 27, 1994

[54] NEURAL NETWORK VIDEO IMAGE PROCESSOR

[75] Inventor: Anthony Zortea, Plumsteadville, Pa.

[73] Assignee: Panasonic Technologies, Inc., Secaucus, N.J.

[21] Appl. No.: 119,873

[22] Filed: Sep. 10, 1993

Related U.S. Application Data

[63] Continuation-in-part of Ser. No. 40,407, Mar. 31, 1993.

[51] Int. Cl.⁵ .............................................. H04N 9/64
[52] U.S. Cl. .................................. 348/222; 348/748; 395/23
[58] Field of Search ................... 358/21 R, 32, 37; 395/20, 21, 22, 23; 348/222, 223, 708; H04N 9/64

[56] References Cited

U.S. PATENT DOCUMENTS

| | | | |
|---|---|---|---|
| 5,212,765 | 5/1993 | Skeirik | 395/23 X |
| 5,216,463 | 6/1993 | Morita | 395/22 X |
| 5,255,347 | 10/1993 | Matsuba et al. | 395/22 X |

OTHER PUBLICATIONS

Hecht-Nielsen, Robert, Theory of the Backpropagation Neural Network, *IEEE Joint Conf. on Neural Networks*, vol. 1, at pp. 1593–1605.

Parulski, K. A. et al., "A Digital Color CCD Imaging System Using Custom VLSI Circuits," *IEEE Transactions on Consumer Electronics*, vol. 35, No. 3, at pp. 382, 388 (Aug. 1989).

Lu, Cheng-Chang and Yong Ho Shin, "A Neural Network Based Image Compressions System", *IEEE Transactions on Consumer Electronics*, vol. 38, No. 1, at pp. 25–29 (Feb. 1992).

Wilson, Stephen S., "Neural Computing on a One Dimensional Simd Array", *Parallel and Distributed Processing*, at pp. 206–211.

Hertz, Krough & Palmer, "6.1 Back-Propagation", *Introduction to the Theory of Neural Computation*, at pp. 119–120 (1991).

*Primary Examiner*—Victor R. Kostak
*Attorney, Agent, or Firm*—Ratner & Prestia

[57] ABSTRACT

A signal processing system for a video camera uses a single neural network to implement multiple nonlinear signal processing functions. In one example, the neural network implements gamma correction, contrast compression, color correction, high pass filtering and aperture correction as a combined function which is emulated by the network. The network is trained off-line using back propagation to emulate the entire composite function for a set of parameters which results in multiple sets of weighting factors. Then, using the stored multiple sets of weighting factors as initial values, the neural network is "re-trained" on-line for each new parameter setting. The use of a single neural network in place of the multiple dedicated processing functions reduces engineering effort to develop the product and may reduce the cost of the total system.

11 Claims, 13 Drawing Sheets

NEURAL NETWORK VIDEO IMAGE PROCESSOR

This application is a continuation-in-part of application Ser. No. 08/040,407, filed on Mar. 31, 1993.

BACKGROUND OF THE INVENTION

The present invention concerns apparatus and a method for processing video signals to implement a plurality of signal processing functions in a single operation, and in particular to apparatus which uses a neural network to perform these functions.

In many signal processing systems, functions are applied to data sequentially. That is to say one function is applied to the input data and the output values produced by that function are applied as the input values to the next function. This type of processing is commonly referred to as pipeline processing.

An exemplary system which employs pipeline processing is a video camera. One such camera is described in an article by K. A. Parulski et al. entitled "A Digital Color CCD Imaging System Using Custom VLSI Circuits," *IEEE Transactions on Consumer Electronics*, Vol. 35, No. 3, pp. 382–389, August, 1989.

The camera described in this paper employs a CCD sensor which collects samples representing successive video images. These samples are then digitized and processed by a color filter array (CFA) signal processor and a red, green, blue (RGB) signal post-processor. The CFA processor generates, from the single image samples provided by the CCD device, a complete set of Red (R), Green (G) and Blue (B) samples. In addition, the CFA processor performs color balance corrections on the RGB signals. The RGB post-processor performs black-level adjustments, gamma correction and aperture correction.

As described in the referenced article, the circuitry used to perform these processing functions is implemented in two VLSI integrated circuits. These circuits represent a relatively large amount of special purpose circuitry produced only after an expensive development cycle.

In addition to requiring a relatively large amount of special purpose circuitry, systems such as that shown in the referenced paper introduce a delay in their processing paths due to the pipelining of the signal processing operations. Parallel signal processing paths may exist in the system, for example, if audio information from the observed scene were being processed in parallel with the video information. The delays caused by the pipeline processing of the video information are desirably compensated for in the audio signal processing circuitry.

While the delays for the referenced video camera processing circuitry are relatively small, other video signal processing apparatus may employ one or more frame delay elements in its processing circuitry. These elements introduce more substantial delays for which compensation is more difficult.

Furthermore, in systems of the type described in the referenced article, there is an inherent conflict between the precision of the design and its cost, as reflected by its complexity. Many of the processing steps performed in a video camera are modeled as relatively simple mathematical functions, even though these functions do not strictly conform to the desired processing steps. These functional models are used only because it would not be cost effective to implement the desired processing steps according to a more rigorous model or to implement multiple independent functions as a single model.

SUMMARY OF THE INVENTION

The present invention is embodied in apparatus and a method which utilizes a neural network to perform a group of independent signal processing functions as a single, combined function. The neural network includes a plurality of input processors which receive the signals to be processed. The network also includes one or more layers of hidden processors and a layer of output processors. The output processors provide the processed output signals.

According to one aspect of the invention, a plurality of sets of weighting factors are defined for the neural network, each set corresponding to a respectively different defined set of control parameters.

According to another aspect of the invention, weighting factors for control parameters interstitial to defined sets of parameters are determined using an on-line training algorithm which is based on the defined parameter sets.

BRIEF DESCRIPTION OF THE DRAWINGS

FIG. 5b is a functional block diagram of an exemplary hardware implementation of FIG. 5a.

FIG. 6 is a block diagram of an exemplary input layer node suitable for use in the neural network shown in FIG. 5a.

FIG. 7 is a block diagram of a hidden layer node suitable for use in the neural network shown in FIG. 5a.

FIG. 8 is a block diagram of an output layer node suitable for use in the neural network shown in FIG. 5a.

FIG. 9 is a flowchart diagram which is useful for describing the programming of the neural network shown in FIG. 4a.

DETAILED DESCRIPTION

Overview

Figure 1:
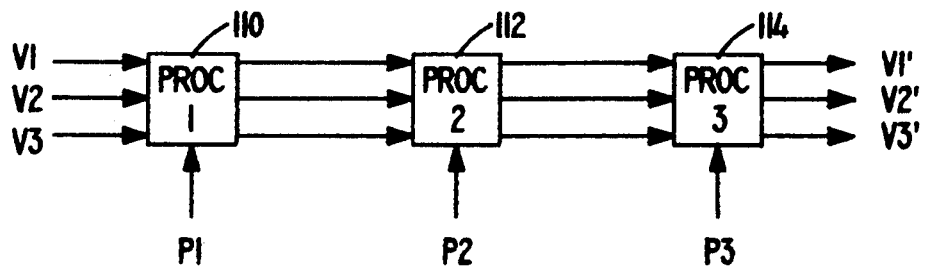
FIG. 1 (prior art) is a block diagram of an exemplary pipeline processing system.

FIG. 1 shows a typical pipeline signal processing system. In this system, three input signals, V1, V2, and V3 are processed sequentially by processors 110, 112 and 114 to produce three output signals V1', V2' and V3'. In this example, the processors 110, 112 and 114 are controlled by parameters P1, P2 and P3 respectively. In the system shown in FIG. 1, each of the processors 110, 112 and 114 is independent; each performs a well-defined operation on its input data values to produce its output data values.

Figure 2:
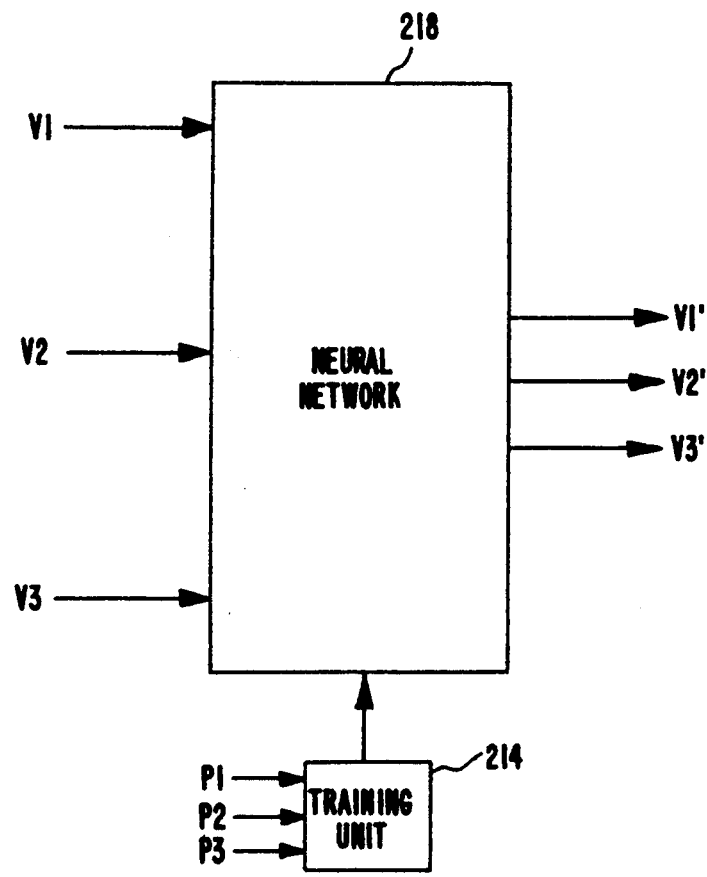
FIG. 2 is a block diagram which illustrates how the pipeline processing system of FIG. 1 may be implemented using a neural network.

One of the underlying ideas of the subject invention is to replace a system such as that shown in FIG. 1 by an otherwise equivalent system, such as that shown in FIG. 2. In FIG. 2, the neural network 210 is coupled to receive the data signal inputs V1, V2 and V3 but, unlike the related copending application Ser. No. 08/040,407, does not receive the parameter signals P1, P2 and P3 as inputs. Rather, parameter inputs P1, P2, and P3 are inputs to a training unit 214 which takes into consideration the parameter inputs when training neural network 210 with input-desired-output vectors.

Although the parameter inputs indirectly affect the weighting factors for the network, they are not included as inputs to neural network 210 in order to indicate that the neural network is dynamic rather than static. That is to say that for each new parameter setting, the neural network is updated with a new set of weighting factors. The parameter setting itself impacts, as described below, the initial values and the desired output vectors used for on-line training. The neural network 210 produces the output signals V1', V2' and V3' as in FIG. 1.

The system shown in FIG. 2 has many advantages over that shown in FIG. 1. First, all three processes are implemented using a single set of hardware. This reduces development and design time and, depending on the relative complexity of the various systems, may also reduce cost. Second, a single failure in one of the processors 110, 112 and 114 may render the entire system shown in FIG. 1 inoperative whereas a single failure in the system shown in FIG. 2 may leave many of the output values unaffected for a given set of input values. Third, if each of the processes performed by the processors 110, 112 and 114 is highly subjective or is poorly modeled by conventional single processing techniques, there may be advantages in implementing the processes on a neural network since the neural network allows the function to be implemented at a higher level of the abstraction; that is to say, not confined to any overly simplified mathematical model. Also, an advantage over the referenced copending application, is that the present invention includes a smaller neural network, due to not having the control parameters as inputs.

In the materials that follow, the video signal processing system is described in the context of a video camera. It is contemplated, however, that the described invention may have more general application in video signal processing. It is also contemplated that the invention may have general application in non-video signal processing where the processing steps are performed sequentially and the actual processes performed are more subjective than objective.

Detailed Description of the Exemplary Embodiments

Figure 3:
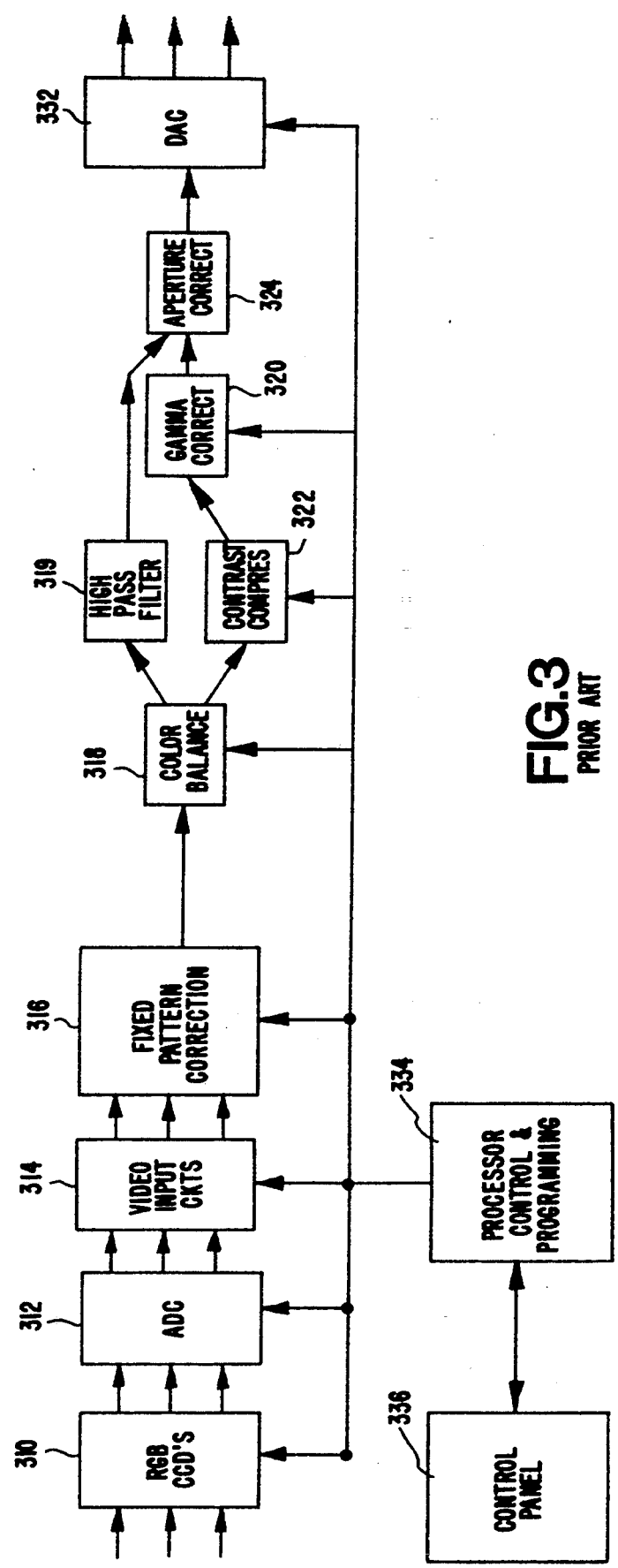
FIG. 3 (prior art) is a block diagram of an exemplary video signal processing system which may be used in a video camera.

FIG. 3 is a block diagram of an exemplary digital video camera system. In the Figure, light from a scene is focused onto separate red, green and blue Charge Coupled Devices (CCD) imagers 310. The CCD imagers 310 produce analog sampled data signals representing, respectively, the red, green and blue color components of the scene, as an image of the scene is focused on the CCD imager. These signals are applied to an Analog to Digital Converter (ADC) 312 which converts the simple data analog signals to digital sample data signals.

The digital signals produced by the ADC 312 are applied to video input circuits 314. In this exemplary circuit, the video input circuits are latches which are used to synchronize the digital values provided by the ADC 312 to the remainder of the camera signal processing circuitry.

The first signal processing step after analog-step, to-digital conversion is the fixed pattern correction step, which is performed by the processor 316. This step may, for example, store an image corresponding to the dark current provided by the CCD imagers 310 (i.e. the charge values produced by the CCD in the absence of light) and subtract this dark current image from the image signals provided by the video input circuit 314.

The output signals produced by the fixed pattern correction circuitry 316 are applied to a color-balance processor 318. The processor 318 adjusts relative amplification factors for each of the red, green and blue signals so that the brightest object in the camera's field of view will appear white on the reproduced image.

The color balance calibration is generally performed only once, during the initial camera set up. The amplification or gain factors developed in this calibration step, however, are applied to the red, green and blue signals provided by the pattern correction circuitry 316 during the remainder of normal imaging operation.

The output signals provided by the color balance processor 318 are applied in parallel to a high pass filter 319 and a contrast compressor 322. The high pass filter 319 provides its output to an aperture correction unit 324 while the contrast compressor provides its output to a gamma correction processor 320. Gamma correction processor 320 also provides its output to aperture correction unit 324. Finally, aperture correction unit 324 outputs the processed r', g' and b' signals to Digital to Analog Converter (DAC) 332 which converts the digital signals to analog signals.

Each process performed on the signals has the following transfer function:

Color Balance $$cb(x) = x \cdot xgain \quad (1)$$

High-Pass Filter $$ap(x,g)_{h,v} = g_{h,v} + \frac{g_{h-1,v}}{4} + \frac{g_{h,v-1}}{4} + \frac{g_{h+1,v}}{4} + \frac{g_{h,v+1}}{4} \quad (2)$$

Gamma Correction $$\Gamma(x) = M \cdot \left(\frac{x}{M}\right)^{\gamma} \quad (3)$$

Contrast Compression $$CC(x) = \left(\frac{M}{\max(r,g,b)}\right) \cdot \left(\frac{\max(r,g,b)}{M}\right)^{c} \cdot x \quad (4)$$

Aperture Correction

-continued $$A(x, ap(x,g)) = x + apgain \cdot ap(x,g) \quad (5)$$

It should be noted that for Equations (1) through (5), M is a normalizing factor that is the maximum possible value for a pixel, max(r,g,b) is the maximum value of a particular [r,g,b] vector, the vector g is g and its 4-neighbors, i.e., above, below, left, and right, and x is r, g, or b. The entire process can be viewed as the following transformation, or remapping:

$$\Phi_{rgain, ggain, bgain, c, \gamma, apgain}(r,g,b) = A(\Gamma((CC(cb(r,g,b))), ap(r,g,b))) \quad (6)$$

The video input circuits 314, fixed pattern correction circuitry 316, color balance processor 318, gamma correction processor 320, and contrast compression processor 322 are controlled by the process control programming circuitry 334. This circuitry receives information from, and provides status information to a control panel 336. In addition to controlling the signal processing system, control and programming circuitry 334 also generates clock signals and other timing signals for the CCD imagers 310, the ADC 312 and the DAC 332.

Figure 4A:
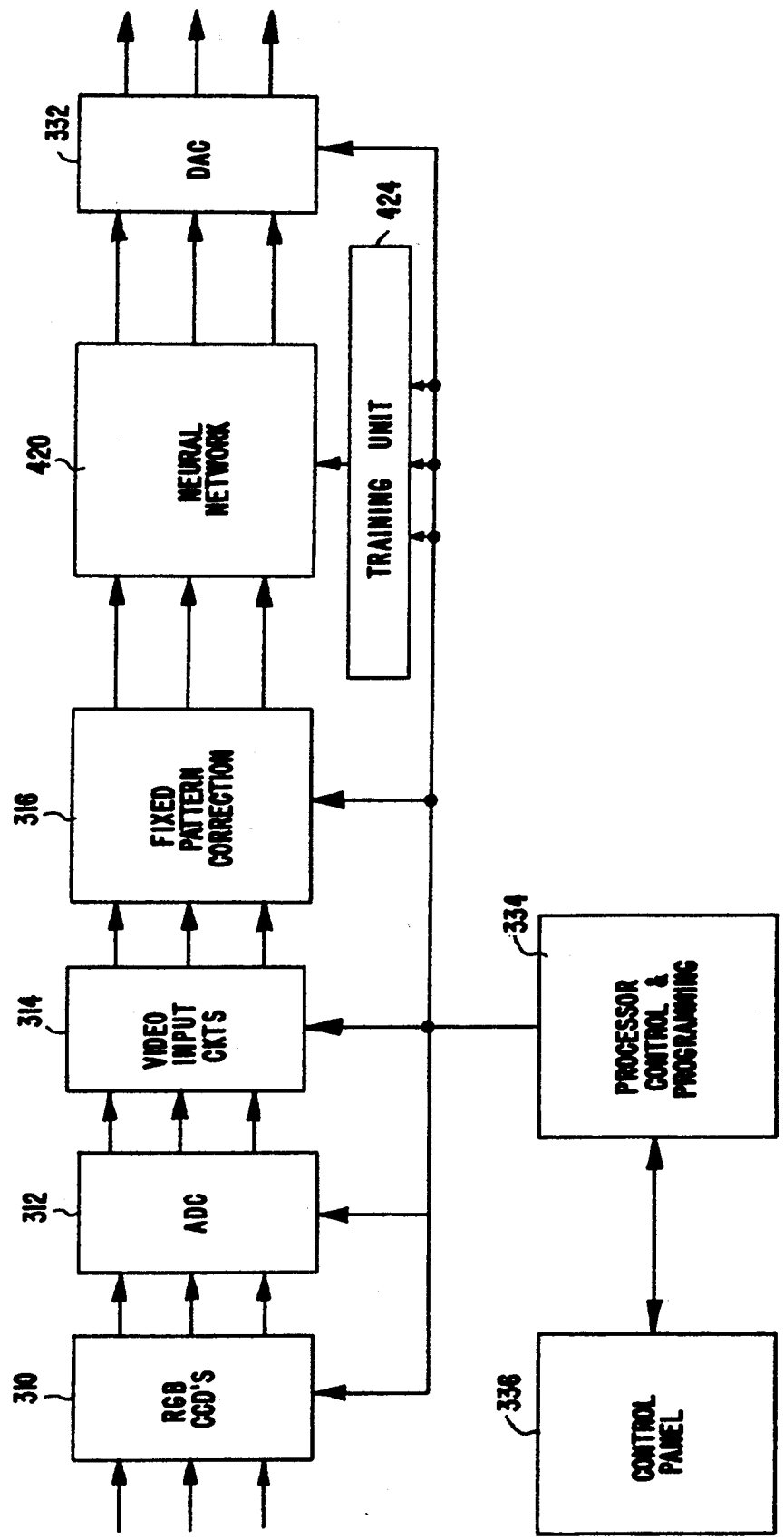
FIG. 4a is a block diagram of a video camera signal processing system which includes a first exemplary embodiment of the present invention including a training unit.

FIG. 4a shows a video camera configuration which is the same as that shown in FIG. 3 except that a neural network 420 and on-line training unit 424 (described in detail below) replace the color balance processor 318, gamma correction processor 320, contrast compression processor 322, high pass filter 319 and aperture correction unit 324. As seen, the on-line training unit 424 receives parameter inputs and generates the appropriate weighting factors for neural network 420. Upon a change of parameter inputs, training unit 424 conducts a simulation using stored test vectors. The results of the simulation are then used to determine and update the programmable weighting factors for neural network 420.

Figure 4B:
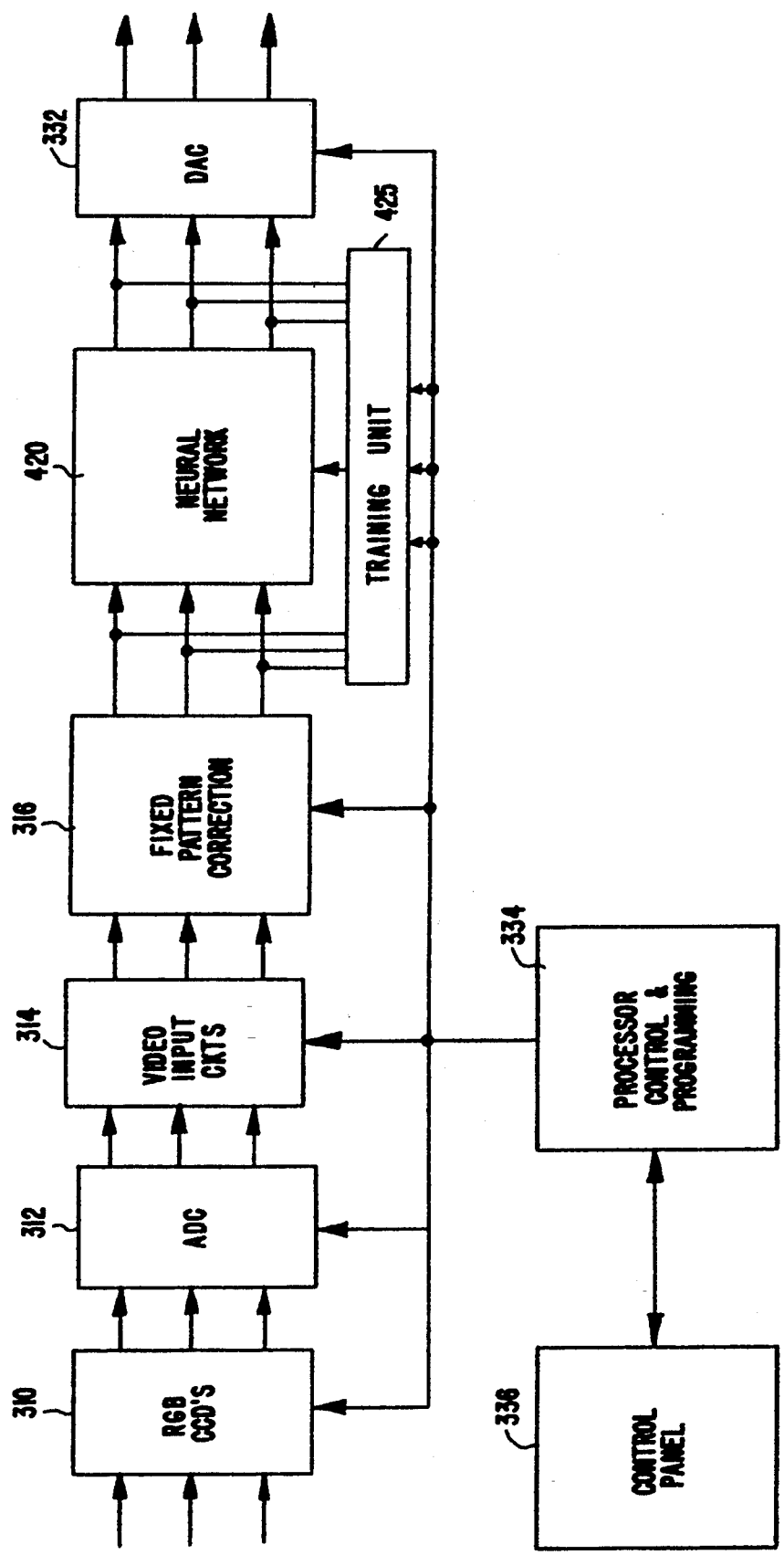
FIG. 4b is a block diagram of a video camera signal processing system which includes a second exemplary embodiment of the present invention including a modified training unit.

FIG. 4b shows an alternate embodiment of the on-line training unit 425 of the present invention. In this embodiment, the on-line training unit 425 is coupled to both the inputs and outputs of neural network 420 so that it can apply input vectors, extract output vectors and compare them with simulated test results. The results of the comparison are then used by training unit 425 to update the programmable weighting factors of neural network 420. One advantage of actually using neural network 420 for its own on-line training is that it would be faster than, for example, a general purpose processor employed by training unit 424.

It can be appreciated by those skilled in the art the interconnection of the training unit 425 to both the input and output signal lines of the neural network 420 can be accomplished by, for example, multiplexers or high impedance drivers.

Disregarding, for the moment, the complexity of the neural network 420, the circuitry shown in FIG. 4a is simpler than the circuits in FIG. 3 if only because it includes fewer components. In addition, as described below, the engineering effort needed to produce acceptable signal processing from the circuits shown in FIGS. 4 may be considerably less than that needed to produce the same level of performance from the circuits shown in FIG. 3.

Even when the complexity of the neural network is considered, the circuitry shown in FIG. 4a may be less costly than that shown in FIG. 3 since the neural network 420 and training unit 424, or the processing elements which make up the networks, may be off-the-shelf general purpose items and, thus, may benefit from volume discounts. In addition, the neural network may be designed to use multiple identical processing elements.

In FIG. 4a, the color balance, the high pass filter, the aperture correction, the gamma correction and contrast compression functions are combined and performed by neural network 420. The combination of these functions is highly nonlinear. The plurality of functions are combined to produce the respective signals r', g' and b' from the input color signals r, g and b.

In equations (1)–(5) or composite equation (6), the signals r', g' and b' are the result of performing the above mentioned functions on the respective r, g and b input signals. This combined process is very nonlinear since it involves multiple exponentials and maximums. In addition one of the output color output signals can change if the corresponding input color signal is the same but one of the other input color signals has changed.

Furthermore, the equations do not lend themselves to being implemented easily either in analog or digital circuitry. While equation (6) may be implemented by a combination of circuits which produce each function, such an implementation severely limits the flexibility of the circuit and requires significant development effort. Finally, if the function is implemented as a large look up table (LUT) the amount of memory needed to hold the LUT even for eight-bit input values would be so large ($2^{(8*7)} = 2^{56}$ or $7.2 \times 10^{16}$) as to make the device impractical.

Figure 5A:
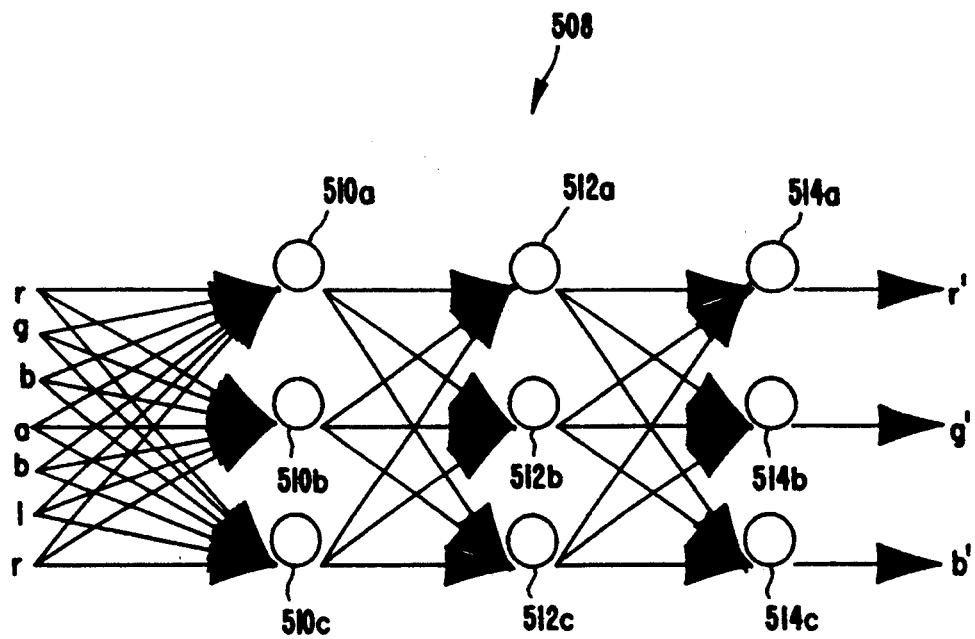
FIG. 5a is a nodal diagram of a neural network suitable for use in the present invention.
Figure 5B:
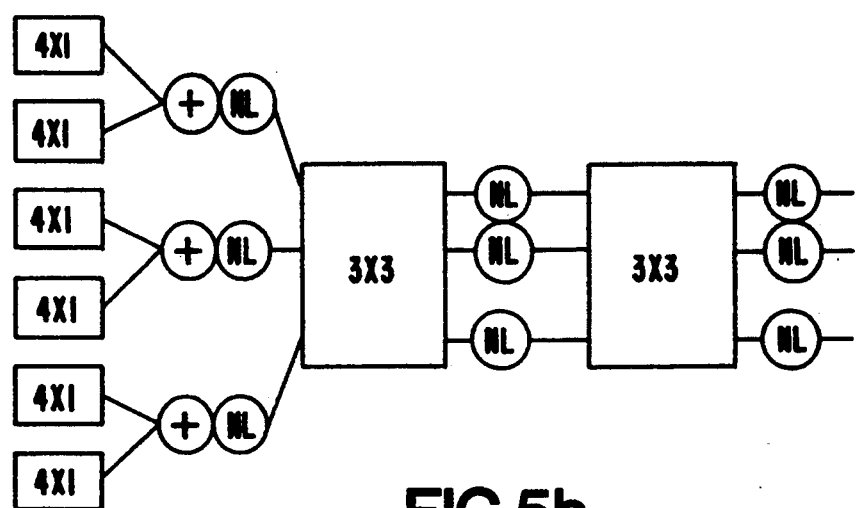

FIGS. 5a and 5b show a nodal diagram of a neural network which is suitable for use as network 420 and a functional block diagram of an exemplary hardware implementation of the network shown in FIG. 5a.

As shown in FIG. 5a, network 420 includes three layers of nodes, input nodes 510a through 510c, hidden nodes 512a through 512c and output nodes 514a through 514c. Each of the input nodes, for example 510a, receives all of the input signals, the color signals r, g and b as well as the g color signal for the pixels above, below, left and right, respectively. Again, network 420 does not have parameter inputs; the parameters are effectively "trained" into the network during the learning phase described in detail below. Not including the parameters as inputs has the advantage of reducing the number of nodes necessary for a given accuracy, yet, has the disadvantage of requiring at least some on-line training for each new set of parameters.

Each input processor in turn provides its output signal to all of the hidden processors 512a through 512c. Each hidden processor, for example 512a, produces three output signals, one of which is applied to output node 514a another, to 514b and the third, to output node 514c. The output nodes 514a, 514b and 514c produce the respective processed color signals r', g' and b'.

Since the aperture correction function is a spatial filtering operation, it is desirable for neural network 420 to include circuitry which stores multiple lines of video samples so that the multiple samples, which surround (i.e., above, below, right and left) the one sample being processed, are applied as input values to neural network 420. It should be noted that this circuitry need not be within neural network 420 as long as the neural network has access to the delayed and advanced samples provided to the signal processing system.

Referring again to FIG. 5a, each node in the network calculates successive weighted sums of successive values applied to its input ports and then transforms the weighted sums through a sigmoidal transfer function (shown in FIG. 5b as NL) to produce its output value. For the input and hidden processors, these output values are applied to all of the processors in the next stage. For the output processors, these output values are the signals r', g' or b'.

FIG. 5b shows an exemplary hardware implementation for the network in FIG. 5a. In this implementation, the processing performed by the input nodes of FIG. 5a is implemented using three pairs of 4×1 dot product units such as, for example, a TRW TDC2246. It should be noted that each pair of 4×1 units receives all 7 inputs. The outputs of the individual 4×1 units for each pair are added and the result is subject to sigmoidal non-linear (NL) transformation which can be implemented using memory.

The output signal of each of the NL circuits is applied to a 3×3 matrix-vector multiplier which performs a sum of weighted products (representing the hidden nodes of network 508) and outputs its results to a second set of NL circuits. The 3×3 matrix-vector multiply, in the exemplary embodiment, is implemented using a TRW TMC2250.

Finally, the output signals from the second set of NL circuits are applied to a second 3×3 matrix vector multiplier which performs a second sum of weighted products (representing the output nodes of network 508) and outputs its results to a third set of NLs. After the final set of NLs perform the non-linear sigmoidal processing, the r', g' and b' signals are output.

Figure 6:
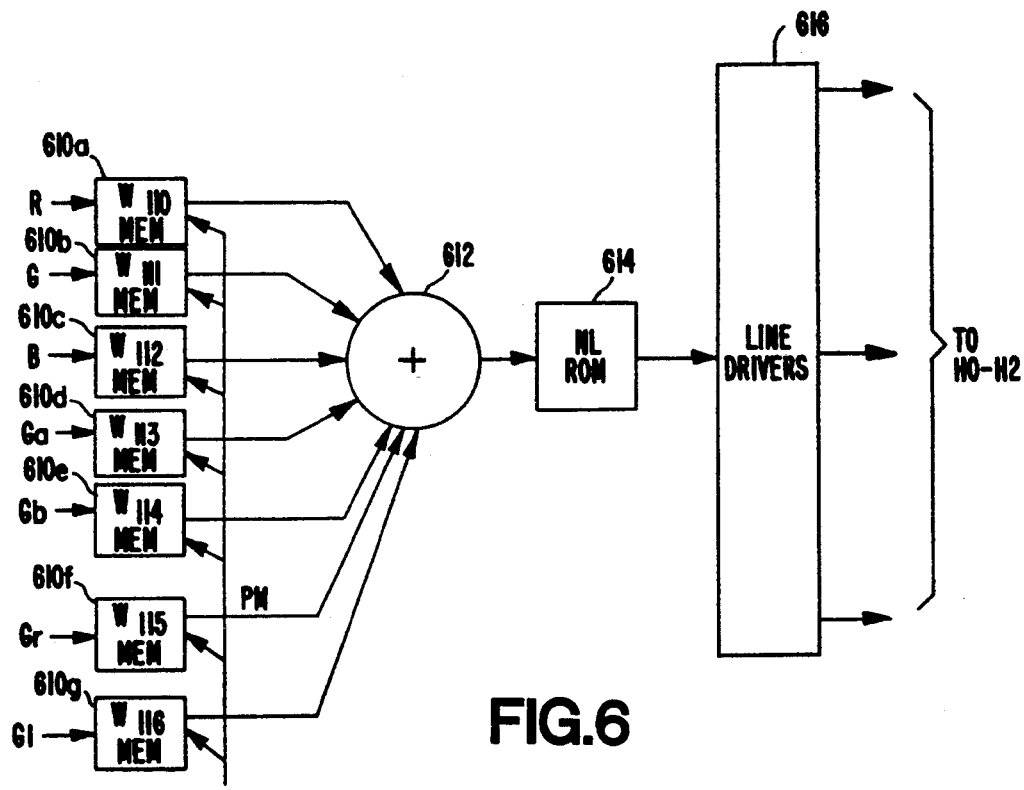

FIG. 6, notwithstanding the exemplary embodiment of FIG. 5b, is a functional block diagram of circuitry suitable for use as one of the input nodes. In FIG. 6, samples of the three color signals r, g and b and samples of the g color signals for pixels above, below, left and right are applied to each of the weighting circuits 610a, 610b, 610c, 610d, 610e, 610f and 610g. The respective weighting factors applied by these circuits are WIi0, WIi1, WIi2, WIi3, WIi4, WIi5 and WIi6, where the subscript I indicates that these are weighting factors from an input processor and the subscript i identifies the particular input processor. These weighting factors are programmable via a programing bus PM. In the exemplary embodiment of the invention each of the circuits 610a through 610g may be a dedicated multiplier circuit in which the programmable weighting factor is applied to the multiplier input port and the respective input signal (r, g, b, ga, gb, gr or gl) is applied to the multiplicand input port.

The weighted output samples provided by each of the weighting circuits 610a through 610g are applied to a summing circuit 612. In a digital embodiment of the invention, the summing circuit 612 may be implemented as a tree of adders.

The output samples provided by the summing circuit 612 are applied to a circuit 614 which implements a nonlinear transfer function. In the exemplary embodiment of the invention, the circuit 614 is a Read-Only Memory (ROM) which is programmed to transform the input value supplied as addresses to output values substantially equal to the input values as modified by the transfer function. In the exemplary embodiment of the invention the transfer function implemented by the circuitry 614 is a sigmoidal function $g_\beta(x)$ having the form shown in equation (7).

$$g_\beta(x) = \frac{1}{1 + e^{-\beta x}} \quad (7)$$

In this embodiment of the invention, the function $g_\beta(x)$ is implemented with $\beta$ having a value of 1. In the materials that follow, this function is referred to as simply $g(x)$.

The output signal of the nonlinear circuit 614 is applied to a line driver circuit 616 which generates 3 copies of the output signal for application to each of the hidden nodes 512a through 512c, shown in FIG. 5a. It should be noted that the output of NL 614 can either be copied before it is output by the node or after it is received as an input to a subsequent node.

Figure 7:
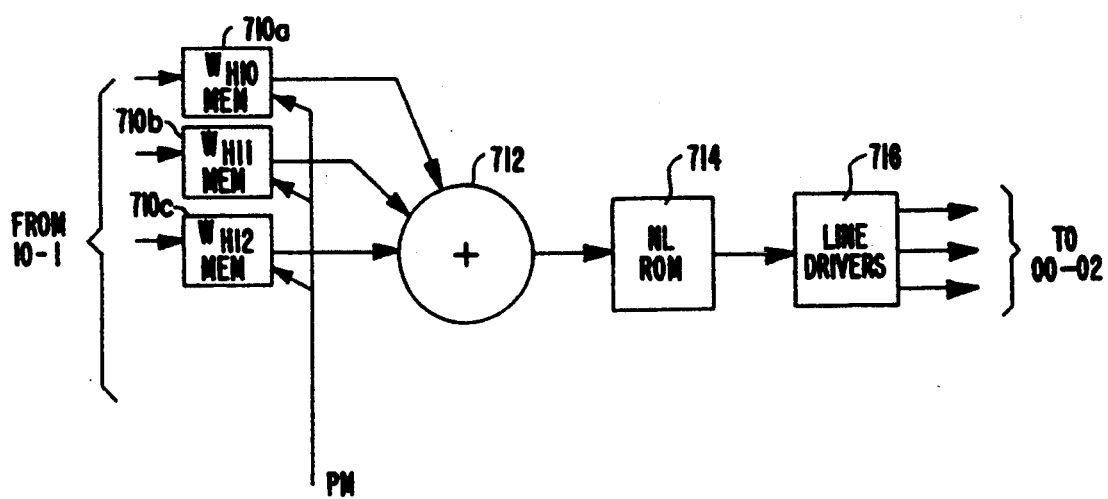

An exemplary hidden processor is shown in FIG. 7. This circuit is the same as the circuitry shown in FIG. 6 except that each of the weighting circuits 710a through 710c receives an input signal from a respectively different one of the input nodes 510a through 510c, shown in FIG. 5a. Each of the weighting factors, WHi0 through WHi2, held by the respective weighting circuits 710a through 710c is independently programable via the programing bus PM. In the notation for these weighting factors, the subscript H indicates that these are hidden processor factors and the subscript i designates a particular hidden processor.

In addition, the circuit shown in FIG. 7 is similar to that shown in FIG. 6 in that the line driver 716 of the hidden processor also generates three copies of the output signal. These three output signals are applied to respectively different ones of the output processors 514a, 514b and 514c shown in FIG. 5a.

Figure 8:
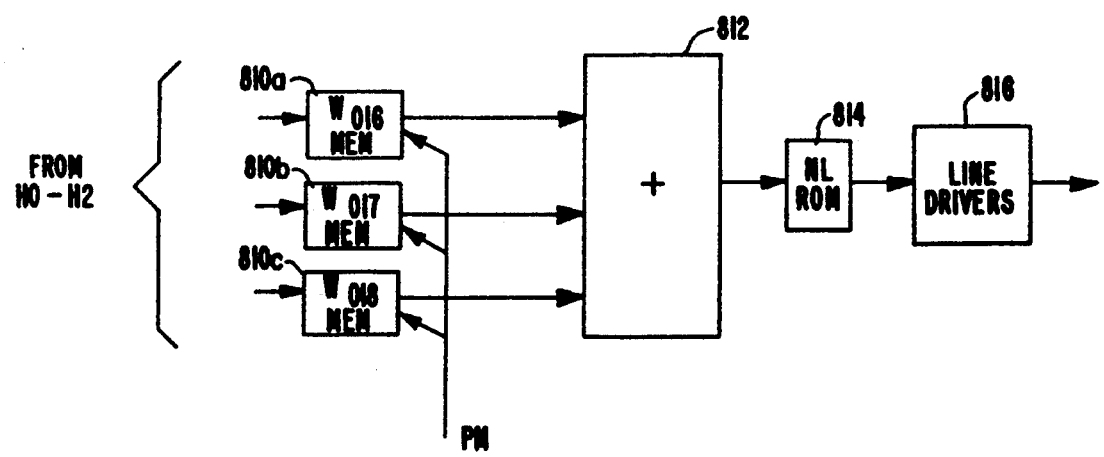

FIG. 8 is a block diagram of an output processor suitable for use as one of the processors 514a, 514b and 514c. As shown in the Figure, the output processor has a similar structure to the input processor and the hidden processor. The output processor has 3 input signals and, so, 3 weighting circuits, 810a through 810c. Each of the weighting factors, WOi0 through WOi2, implemented by the respective weighting circuits 810a through 810c is independently programable via the programming bus PM. In the notation for these weighting factors, the subscript O indicates that these are output processor factors and the subscript i designates a particular output processor. The weighted output values provided by the weighting circuits 810a through 810c are summed in a summing circuit 812.

The output signal of the summing circuit 812 is applied to a nonlinear ROM 814 which may be identical to the nonlinear ROM's 614 and 714 shown in FIGS. 6 and 7 respectively. The output signal provided by the nonlinear ROM 814 is applied to a line driver 816 which generates an output signal having sufficient strength to drive the circuitry to which the output processor 514a, 514b or 514c are coupled.

Referring again to FIG. 4a, the neural network 420 is programmed to implement the transfer functions of the color balance, the high pass filter, the aperture correction, the gamma correction and contrast compression algorithms by programming the values of the weighting factors in each of the input, hidden and output processors. These weighting factors are programmed using a learning algorithm based on a set of known input/output signal combinations. This algorithm, which is implemented on training unit 424, determines values of the weighting factors which produce an acceptable approximation of the combined functions, as defined by equation (6). One method by which these weighting values are determined, commonly referred to as back-propagation of error, is described below.

It should be noted that the network of FIG. 5a is reduced in size as compared to, for example, the network of application Ser. No. 08/040,407. This reduced size results from not including the parameter settings in the input vector. However, not including the parameter settings in the input vector means that the neural network 420 should be retrained for each new parameter setting, thus, requiring on-line training.

An important feature of the present invention is embodied in its network training technique which is a combination of off-line training and on-line training. The off-line training is designed to reduce the amount of time needed for on-line training, for example, no more than 1 second in the exemplary embodiment.

To facilitate this, it is important to have good initial weight values before on-line training begins. In the exemplary embodiment, this is achieved by training the neural network off-line for a predetermined set of parameter vectors, and storing the set of resultant weighting factors. Then, during on-line operation of the camera processor, for some desired parameter setting, the appropriate initial weight vector is used. In the exemplary embodiment, the appropriate initial weight vector is determined by a distance metric which compares the desired parameter vector to the stored sampled parameter vectors, and the stored sampled parameter vector with the "closest" parameter setting is used. Obviously, if the on-line parameter setting is the same as one of the stored sampled parameter vectors, then on-line training need not be performed because suitable weighting factors for this parameter setting are already stored in memory.

An example of a distance metric suitable for determining the closest stored parameter setting, $P_s^*$, is $$D(P_d, P_s) = \sum_{i=1}^{n} (P_{di} - P_{si})^2$$

where $P_d = (P_{d1}, P_{d2}, P_{d3} \ldots P_{dn})$ is the desired parameter vector; where $P_s = (P_{si})$ are the stored parameter vectors, such that $s = 1 \ldots k$ and $i = 1 \ldots n$, where n is the number of control parameters and k is the number of predetermined parameter vectors. $D(P_d, P_s)$ is computed for $s = 1, \ldots k$, and the s that renders the minimum $D(P_d, P_s)$ yields $P_s^*$, or $$\min_s [D(P_d, P_s)] => P_s^*$$

The predetermined weights associated with $P_s^*$ are then used as the initial weights for on-line training.

It should be noted that, even if an on-line change in the parameter settings is not identical to a stored sampled parameter setting, a set of stored weighting factors may still be adequate for the particular parameter setting. The determination as to whether a set of weighting factors is adequate for a range of values within a particular dimension of the parameter vector, thus requiring no on-line training, can be calculated off-line or programmed into a flexible distance metric.

Figure 10A:
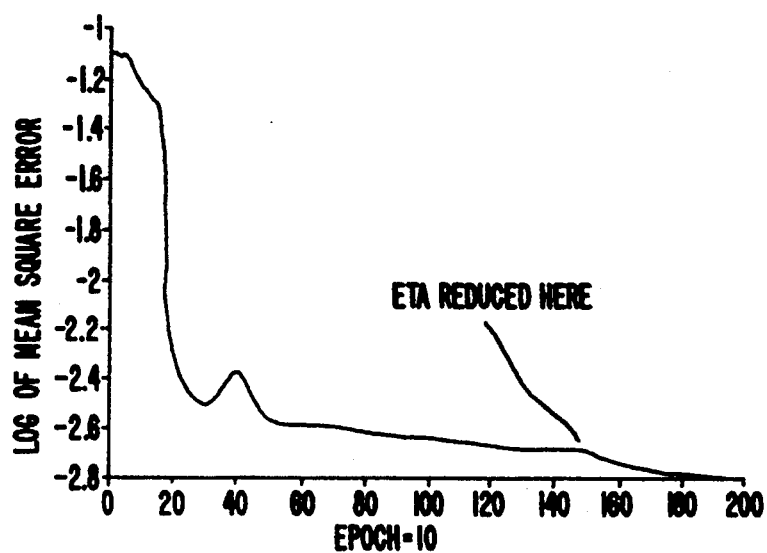
FIGS. 10a and b are graphs illustrating the timing of off-line and on-line network processing, respectively.

As an example of the off-line/on-line training strategy, assume the parameter vector setting of FIG. 10a (rgain = 1, ggain = 1 bgain = 1, C = 0.4, gamma = 1, apgain = 2). Starting with small random initial weights, off-line training proceeds and produces, for example, the error shown in FIG. 10a. After this training, these weights are stored and associated with the parameter vector setting described above.

Figure 10B:
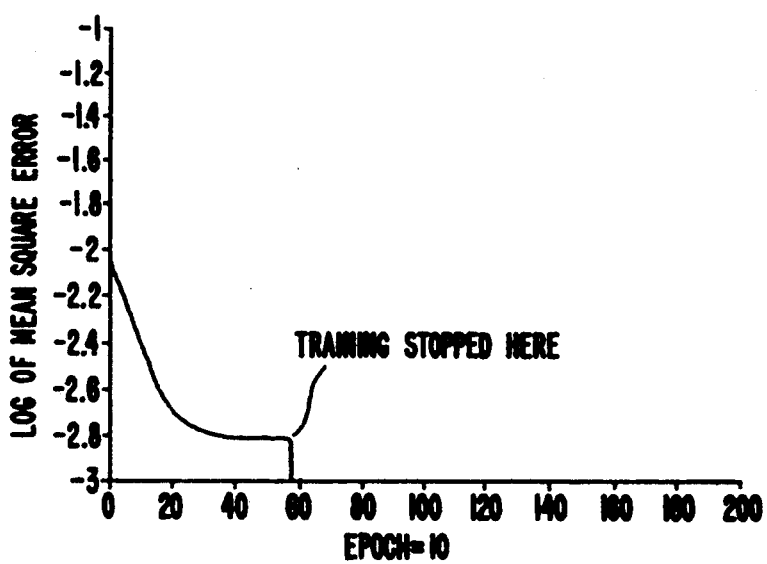

Then imagine that during operation of the camera processor, a parameter setting close to this was desired (for example, apgain = 3, and all other values the same). The neural network 420 is then trained for the new setting, but the initial weight values used would be those computed for the parameter settings of FIG. 10a. Training would proceed and produce the errors of FIG. 10b. It can be seen from FIG. 10b that the initial error is small, and training reached an acceptable error after only about 500 epochs, whereas in FIG. 10a, the error was not yet acceptable even after 2000 epochs.

One technique for computing weighting values, as described in detail below, is to first "train" the network for a single function. Then, using those values, train the network for a composite function consisting of the first function and a second function. This process is continued until each of the functions is accounted for in the neural network.

The above procedure facilitates the training of complex neural networks which may otherwise be too difficult to train directly from the ultimate composite function. In the exemplary embodiment of the present invention, the neural network can be trained off-line using this procedure or, because of its reduced size and complexity, it can be trained directly from the ultimate composite function as described by Equation (6).

Figure 9:
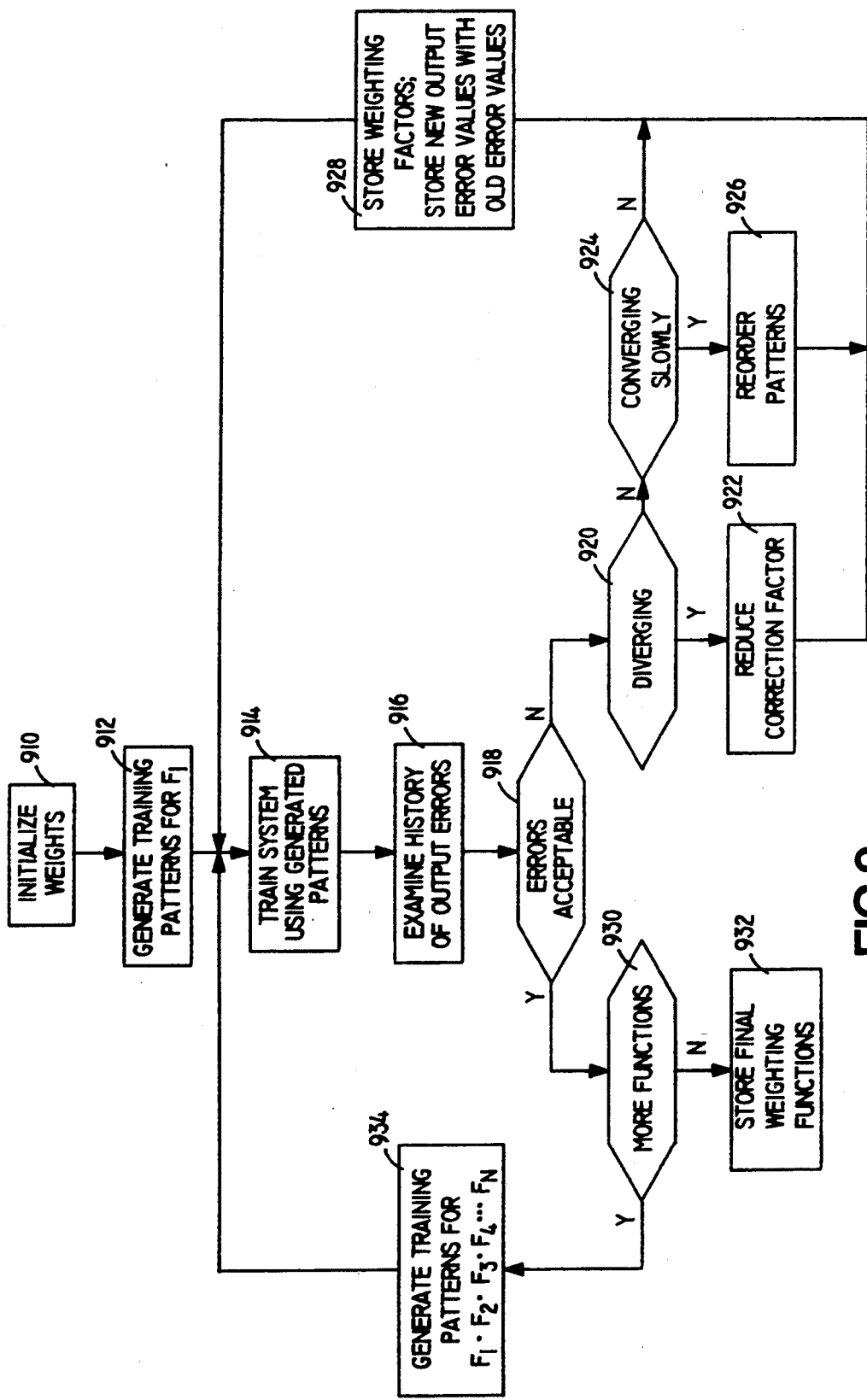
Figure 11:
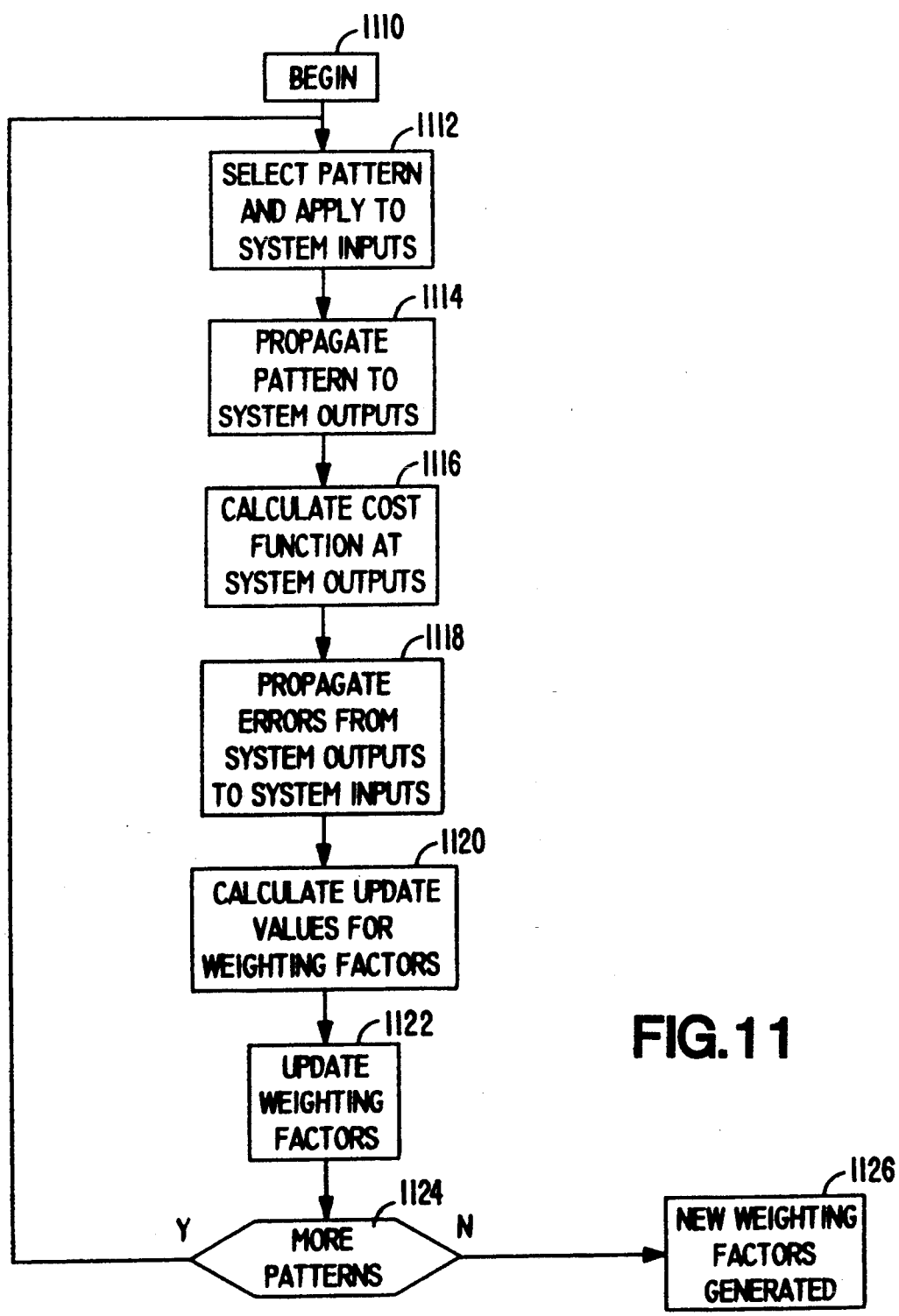
FIG. 11 is a flowchart diagram which is useful for describing the method by which the neural network is trained using the generated patterns, as shown in one of the steps of the flowchart diagram of FIG. 9.

To be complete, as illustrated by the flowcharts of FIGS. 9 and 11, a general method of determining off-line the weighting values for multiple sets of parameter settings which are then stored for use in on-line training is described. In the exemplary embodiment of the invention, this algorithm is implemented "off-line" using a general purpose computer.

The off-line processing is for determining and storing initial weighting factors which are used to initialize the neural network prior to the on-line training process. This off-line processing is performed for each new parameter setting selected for training. In the exemplary embodiment, a representative sampling of the parameter space is taken keeping in mind that the resultant weighting values are to be used as initial values for on-line training.

At the first step of this method, step 910 of FIG. 9, each of the weighting values in each of the input, hidden and output processors is set to an initial value. These initial values represent a starting point in the search for the best set of weighting values which will implement the desired function.

The next step in the process, step 912, generates a set of training patterns for function $F_1$. In the exemplary embodiment of the invention function $F_1$ may be, for example, the gamma correction function of equation (3) such as may be implemented by the gamma correction processor 320 of FIG. 3. Or, as mentioned above, for simple networks $F_1$ can be the ultimate composite function of equation (6), but for purposes of a complete explanation, $F_1$ is assumed to be equation (3).

To produce the test patterns, the program selects a $\gamma$ parameter setting, then generates multiple sets of random input values of r, g, b, ga, gb, gr and gl and applies these values to the gamma equation (3) to obtain the corresponding output values representing the gamma corrected r, g and b color signals. Each set of input values and its corresponding output values forms one training pattern for function $F_1$ having the selected $\gamma$ setting. When a sufficient number of different patterns have been generated control passes from step 912 to step 914 in which the system is trained using the generated patterns. As described below, in the exemplary embodiment of the invention, the neural network will be trained to implement the transfer function that was used to generate the training patterns by repeatedly applying the patterns to the simulated network. Step 914 represents only one application of the training patterns.

The process performed by step 914 is illustrated in more detail in FIG. 11. After the process has been initiated, at step 1110, control shifts to step 1112 where a pattern is selected and applied to the system inputs. In this instance, since the neural network is being simulated on the computer which is determining values for the weighting factors, the system inputs are actually simulated input terminals of the simulated neural network. The values applied to the simulated input terminals at any given time are the randomly determined values for r, g, b, ga, gb, gr and gl from the test patterns produced in step 912, shown in FIG. 9.

After the test input values have been applied in step 1112, they are propagated through the simulated neural network to the simulated output terminals at step 1114. In this step, the simulated neural network, using whatever weighting factors have been currently assigned, processes the input signal values to produce corresponding output signal values.

At step 1116, these propagated output values are compared to the output values from the corresponding test patterns. Each of these comparisons produces an error value representing a difference between the output value produced by the neural network and the pre-calculated output value for the applied input values. It is contemplated that the error value or "cost function" may be calculated in a number of ways. One way would be to calculate the absolute difference between the actual output signal and the desired output signal. Using this method, the cost function at the output port of processor 514a of FIG. 5a would be the arithmetic difference between the actual red signal value, $r_a$, and the desired red signal value, $r_d$ (i.e., $r_a-r_d$).

Another possible cost function would describe signal differences which are important for video signal processing, for example, the difference between the actual and desired color ratios and/or the difference between the actual and desired luminance and color difference values. In this sense, for each of the output processors 514a through 514c of FIG. 5a, step 1116 calculates a cost function value, CF, of all of the actual output signals ($r_a$, $g_a$ and $b_a$) and all of the desired output signals ($r_d$, $g_d$ and $b_d$). One such cost function, again for processor 514a is given in equation (8).

$$CF = (r_a - r_d) + \left(\frac{r_a}{g_a} - \frac{r_d}{g_d}\right) + \left(\frac{r_a}{b_a} - \frac{r_d}{b_d}\right) \quad (8)$$

At step 1118, each of these cost function values is propagated backward through the neural network from the simulated system output terminals to the simulated system input terminals. This error propagation is illustrated by equation (9).

$$\delta_i = g'(x_i) CF(O_{ia}, O_{id}) \quad (9)$$

where $\delta_i$ is the error at the ith output terminal (i.e. the error in the output value produced by the ith output processor) multiplied by the gradient of the nonlinear function, CF is an appropriate cost function value which is calculated from $O_{id}$, the desired output value from the test pattern, and $O_{ia}$, the actual output value produced by the simulated neural network (e.g. the CF calculated in equation (8) or $[O_{ia}-O_{id}]$). In equation (9), $x_i$ is the sum of the weighted input values which were applied to the ith output processor and $g'(x)$ is the first derivative of $g(x)$, which is given in equation (10).

$$g'(x) = 2g(x)[1-g(x)] \quad (10)$$

At step 1120, an error value for each weighting factor is calculated for each processor in the output, hidden and input stages through back-propagation. These calculations are represented by equation (11).

$$\delta_{k-1,i} = g'(x_{k-1,i}) \sum_j W_{kij} \delta_i \quad (11)$$

where the subscript k designates a particular processor level (i.e. input, hidden or output), the subscript $k-1$ designates the previous level, the subscript i indicates a particular processor at that level and the subscript j indicates a particular input terminal of the ith processor.

At step 1122, the weighting factors, $W_{kij}$ are updated by changing their values by a correction term $\Delta W_{kij}$ which is determined in accordance with equation (12).

$$\Delta W_{kij} = \eta \delta_{k,i} V_{k-1,j} \quad (12)$$

where $\eta$ is a correction factor which determines the rate at which the values of the weighting factors are allowed to change, and $V_{k,i}$ is the output value produced by the jth processor at level k. Once the weighting factors have been updated, the processing for this instance of this pattern is complete.

At step 1124, the simulation system determines if there are more patterns to be applied in this step. If so, control transfers to step 1112 to select the next input pattern and to apply its input values to the simulated system inputs. Otherwise, if no more patterns are to be applied, control transfers to step 1126 wherein the weighting factors generated by the process shown in FIG. 11 are marked as the new weighting factors for the neural network.

Returning to FIG. 9, after step 914, step 916 examines the history of the output errors produced by using the last several sets of weighting factors. In the exemplary embodiment of the invention, this is done by running the simulator, programmed with each of the sets of weighting factors that were generated using the last selected set of patterns, and comparing the output values generated by the simulated neural network to the respective desired output values contained in the generated training patterns.

Next, step 918 is invoked to determine if the errors are within an acceptable range of tolerance. If the errors are not acceptable it may be that the values of the weighting factors are diverging, as determined by step 920. If the weighting factors are diverging, step 922 is invoked to reduce the magnitude of the correction term $\eta$ in equation (11). As described above, by reducing the value of this term, the gain of the feedback system is reduced, causing the values of the weighting factors to change more slowly.

If, at step 920, it is determined that the weighting factor values are not diverging, step 924 is executed to determine if the weighting factor values are converging too slowly. If this is determined at step 924, step 926 is invoked which reorders the patterns in the set. If it is determined that the weighting factors are not converging to slowly at step 924, and after steps 922 and 926, step 928 is invoked which stores the new weighting factors for use by the simulated neural network and stores the error values that were used to generate the factors with the previous error values. The stored error values are used by step 916 as described above. After step 928, control is transferred to back to step 914.

If at step 918, it was determined that the error values for the current set of test patterns are acceptable, step 930 is invoked to determine if there are more functions to be simulated by the neural network. If so, step 934 is executed which generates training patterns for the next combination of functions.

Step 934, for this example, would be invoked a first time to combine the contrast compression function with the gamma correction function, a second time to combine the color balance function with the combined gamma correction and contrast compression function, and a third time to combine the aperture correction function with the combined gamma correction contrast compression and color balance functions. Furthermore, the embodiment of FIG. 4a is general enough to be able to implement additional processes such as colorimetry correction and local histogram equalization.

The neural network may also be used to implement processes which may change from camera to camera but which are invariant in a particular camera. One such process may be to correct the output signal of the imager for aberrations in the lens system or in the imager itself. Once the imager and lens systems are mounted, these aberrations do not change. Accordingly, there would be no need for a control input signal to the neural network for this function. The function to correct for aberrations of this type may be the first of the series of functions to be implemented in the neural network.

Returning to FIG. 9, each invocation of step 934 would be preceded by a process as illustrated by steps 914 through 928 in which the weighting factors for each processor in the neural network are updated using generated patterns for the previous function or combination of functions.

If, when step 930 is executed, it is determined that no more functions need to be simulated, step 932 is executed in which the final weighting factors for the particular parameter setting are stored. The entire process is then repeated for each set of parameter settings resulting in a set of stored weighting factors for each sampled parameter setting.

Referring once more to FIG. 4a, when the final sets of weighting factors have been stored, the camera circuitry shown in FIG. 4a is ready for operation.

In the exemplary embodiment of the present invention, due to the time concerns discussed above, the on-line training of the neural network employs a slight variation of that described with respect to FIGS. 9 and 11. During on-line training, rather than training the neural network function by function, the ultimate composite function is used.

Figure 13:
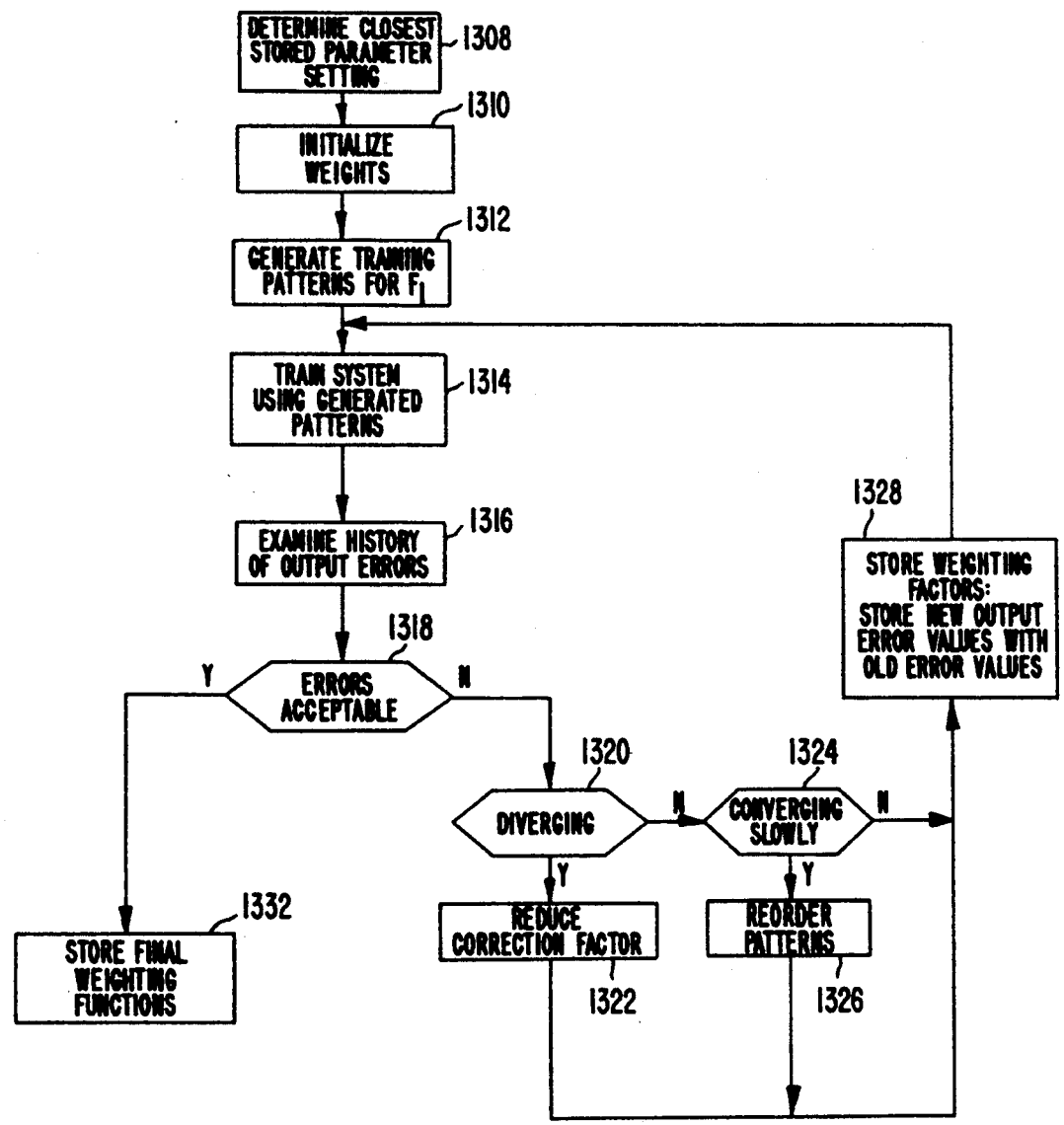
FIG. 13 shows a flowchart illustrating a suitable on-line training technique employed by the exemplary embodiment.

FIG. 13, similar to that of FIG. 9, shows a flowchart illustrating the on-line training technique used in the exemplary embodiment of the present invention. In step 1308, the distance metric is used to determine which of the parameter settings processed off-line is closest to the on-line parameter setting. Next, in step 1310, the weighting factors for the closest off-line parameter setting are used as the initial weights for on-line training.

The training patterns of step 1312 are calculated directly from equation (6) to generate input-desired-output vectors. In doing so, the [r,g,b] input space is sampled linearly, sampling each dimension at 5 points. For each, [r,g,b] vector, the green neighbors are drawn randomly using a Gaussian distribution, with the center green pixel as the mean and 0.1*M (where M is the same as that in Eqs. (3) and (4)) as the standard deviation. The output vectors are then generated using the pixel input vector, the parameter input vector and Equation (6). This procedure generates a total of 125 vectors for training.

The description for the remainder of the flowchart is the same as described above for FIG. 9. In the exemplary embodiment of the invention, this algorithm is implemented "on-line" using a general purpose processor in the video camera, for example the training unit 424 shown in FIG. 4a.

In the alternate embodiment shown in FIG. 4b, the training algorithm would likely be faster and less complex because the actual neural network 420 would be used to "simulate" the results during the on-line training process. Training unit 425, however, would still be used to perform the remaining functions, as described above, in determining proper weighting factors.

As mentioned, the above-described procedure for computing the weighting values by using directly the ultimate composite function is desirable for small, relatively simple neural networks; if, however, the neural network of the present invention includes additional functionality (i.e., other processing units in the video camera) or simply becomes more complex in a different application such as medical imaging or space imaging, then, the more generally applicable training procedure described above should be used.

Figure 12A:
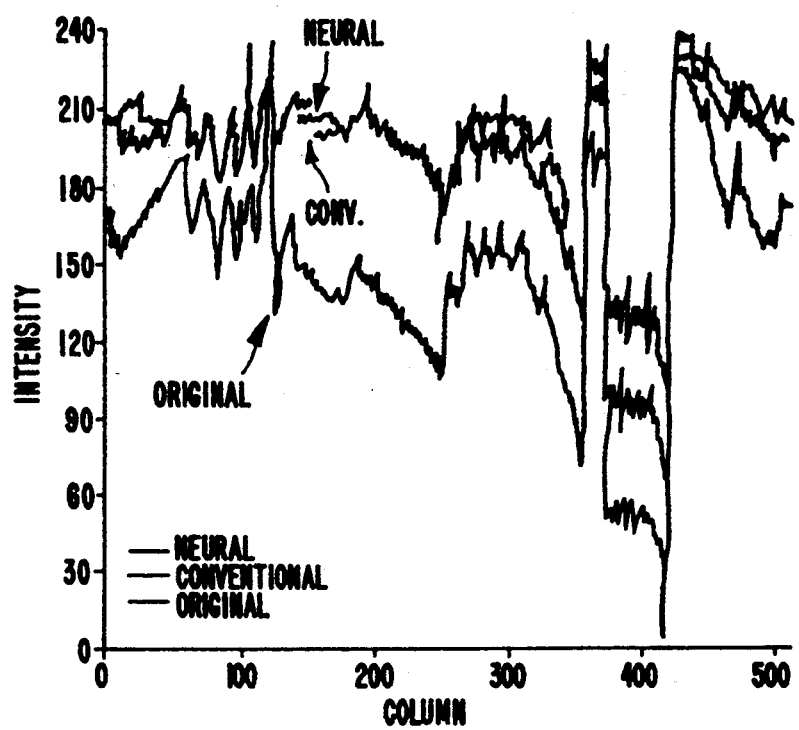
FIGS. 12a, b, and c are graphs comparing the results obtained by the neural network of the present invention with a conventional process.
Figure 12B:
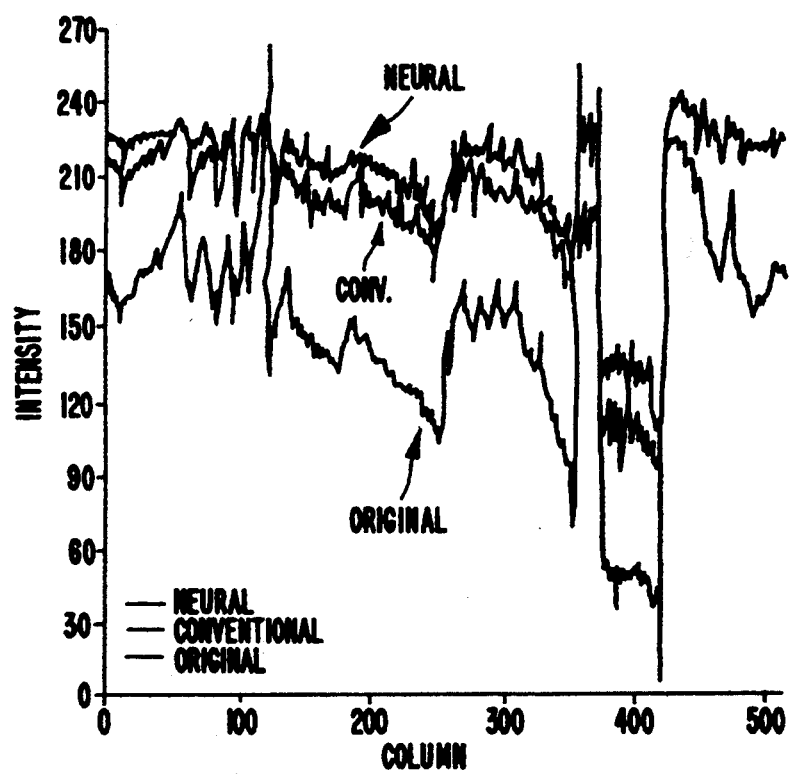
Figure 12C:
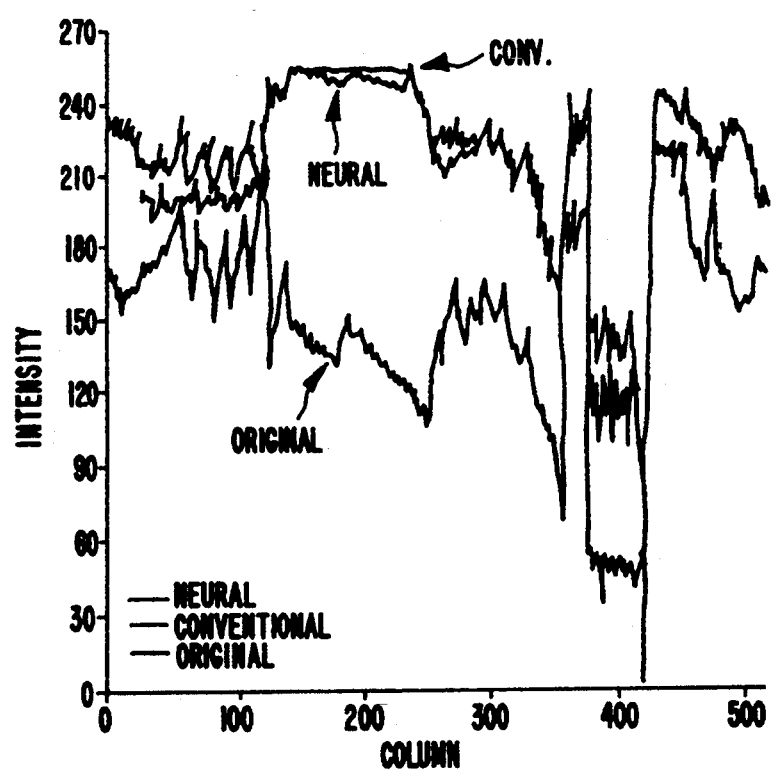

FIGS. 12a–12c show the results of rudimentary comparisons between conventional and neural processing of the exemplary embodiment of the present invention. A color test image was selected randomly. Various parameter settings were selected and the test image was simulated with both the neural and conventional processor. The 1D plots were generated by plotting a single row of the image. Some comparisons are presented in FIGS. 12a and 12b. In FIG. 12a, the parameter vector was [rgain=1, ggain=1, bgain=1, gamma=1, contrast=0.4, apgain=0] and in FIG. 12b, the parameter vector was [rgain=1, ggain=1, bgain=1, gamma=0.5, contrast=1.0, apgain=1.0].

As an example of the programmability of the neural method, consider changing the contrast compression transformation function. The new transformation increases the saturation twice as much as the luminance (while maintaining the hue) as opposed to equally increasing the saturation and luminance (which is the function of Equation 4). This transformation change requires no change to the neural network architecture; however, by definition, a conventional analog or digital signal processing system would need to be updated. A test image was processed using this new form of contrast compression, and the results can be seen in FIG.

12c. In FIG. 12c, the parameter vector was [rgain=1, ggain=1, bgain=1, gamma=1, contrast=0.4, apgain=1].

Note that FIG. 12c has essentially the same errors with the new contrast compression scheme as with the previous definition. This is essentially the power of the neural network; even though the desired transformation changed, the architecture of the network remained the same, only the weights changed.

While the invention has been described in terms of an exemplary embodiment it is contemplated that it may be practiced as outlined above within the spirit and scope of the appended claims.

What is claimed:

1. A signal processing system having a plurality of parameter inputs comprising:
   a neural network for emulating a plurality of non-linear signal processing functions, the neural network having a plurality of input terminals for receiving a plurality of input signals; a plurality of output terminals for providing a plurality of output signals; and receiving means for receiving a plurality of weighting factors, wherein the weighting factors are programmable and are updated on-line each time one of the plurality of parameter inputs changes; and
   means for storing a plurality of sets of predetermined weighting factors which were calculated off-line, each set corresponding to a respectively different set of values for the plurality of parameter inputs;
   on-line training means for determining on-line, a set of weighting factors for each set of parameter settings for which no set off-line predetermined weighting factors exists, said determined weighting factors being determining by using, as initial values for on-line training, a set of off-line predetermined weighting factors having a corresponding plurality of parameter inputs which approximate the parameter settings; and
   programmable means for applying the determined weighting factors to the receiving means to enable the neural network to emulate the plurality of nonlinear signal processing functions.

2. A signal processing system according to claim 1, wherein:
   the neural network emulates a plurality of video signal processing functions; and
   the input terminals of the neural network are coupled to receive signals representing red, green and blue color signals.

3. A signal processing system according to claim 1, wherein:
   the signal processing system is in a color video camera;
   the input terminals of the neural network are coupled to receive signals representing red, green and blue color signals; and
   the plurality of signal processing functions are selected from a group consisting of gamma correction, contrast compression, high pass filtering, color balance and aperture correction.

4. A signal processing system having a plurality of parameter inputs comprising:
   a neural network for emulating a plurality of non linear signal processing functions, the neural network having a plurality of input terminals for receiving a plurality of input signals; a plurality of output terminals for providing a plurality of output signals; and receiving means for receiving a plurality of weighting factors, wherein the weighting factors are changed on-line each time a significant change is made in one of the plurality of parameter inputs; and
   means for storing a plurality of sets of predetermined weighting factors which were calculated off-line, each set corresponding to a respectively different set of values for the plurality of parameter inputs;
   on-line training means for determining on-line a set of weighting factors for a new set of parameter settings for which no set of off-line predetermined weighting factors exists, said determined weighting factors being determined by using a set of off-line predetermined weighting factors, having a similar corresponding plurality of parameter inputs, as initial values for training, the on-line training means comprising:
      means for determining which one of the stored sets of off-line predetermined weighting factors is to be used as initial values during training;
      means for training the neural network as a function of the initial values to determine weighting factors for the new set of parameter settings; and
   programmable means for applying the weighting factors to the receiving means to enable the neural network to emulate the plurality of nonlinear signal processing functions.

5. A system according to claim 4, wherein the means for training comprises:
   simulator means for simulating a response of the neural network to each of the input vectors of the test patterns to produce a vector of simulated output values;
   means for calculating a plurality of cost function values, each cost function value representing a mathematical function of selected ones of the simulated output values and corresponding desired output values from the desired output vector;
   back propagation means, responsive to the cost function values, for modifying each of the programmable weighting factors to minimize the cost function values; and
   means for determining when the weighting factors have converged to values which allow the neural network to emulate the signal processing function with acceptable error.

6. A system according to claim 5 wherein each cost function value is a function of all of the simulated output values of the neural network.

7. A method of processing a plurality of input signals according to a plurality of nonlinear signal processing functions to produce a plurality of output signals, in a system which includes a neural network having a plurality of programmable weighting factors, the method comprising the steps of:
   calculating off-line a plurality of sets of weighting factors corresponding to a plurality of predetermined sets of parameter input settings;
   storing the plurality of sets of weighting factors for use during on-line operation of the neural network;
   training the neural network on-line for each set of parameter input settings which is not equivalent to one of the predetermined sets of parameter settings wherein initial values used for on-line training are directly related to the stored sets of off-line calculated weighting factors; and processing the input signals using the neural network to produce the output signals.

8. The method according to claim 7 wherein the step of training the neural network further includes the steps of:
setting the initial values for the neural network as a function of at least one set of off-line calculated sets of weighting factors;
generating a plurality of test patterns, representing the composite nonlinear signal processing function, each pattern in the plurality of test patterns containing an input vector and an output vector;
simulating a response of the neural network to the first plurality of test patterns and modifying the initial weighting factors of the neural network to conform the simulated response of the neural network to the output vectors contained in the first plurality of test patterns to generate a plurality of new values for the weighting factors;
repeating, as necessary, the step of simulating until the new values for the weighting factors conform the response of the neural network to within acceptable predetermined limits of the simulated response; and
applying the final new values of the weighting factors to the neural network.

9. The method according to claim 8 wherein the step of simulating is actually performed using the neural network.

10. A signal processing system having a plurality of parameter inputs comprising:
a neural network for emulating a plurality of nonlinear signal processing functions, the neural network having a plurality of input terminals for receiving a plurality of input signals; a plurality of output terminals for providing a plurality of output signals; and receiving means for receiving a plurality of programmable weighting factors, wherein the programmable weighting factors are changed on-line each time a significant change is made in one of the plurality of parameter inputs; and
means for storing a plurality of sets of predetermined programmable weighting factors, each set corresponding to a respectively different set of values for the plurality of parameter inputs;
on-line training means for determining on-line a set of weighting factors for a new set of parameter settings for which no set of weighting factors exists, said determined weighting factors being a function of at least one of the stored sets of weighting factors, the on-line training means comprising:
means for determining which one of the stored sets of weighting factors is to be used as initial values during training;
means for training the neural network as a function of the initial values to determine weighting factors for the new set of parameter settings, wherein the means for training comprises:
simulator means for simulating a response of the neural network to each of the input vectors of the test patterns to produce a vector of simulated output values;
means for calculating a plurality of cost function values, each cost function value representing a mathematical function of selected ones of the simulated output values and corresponding desired output values from the desired output vector;
back propagation means, responsive to the cost function values, for modifying each of the programmable weighting factors to minimize the cost function values; and
means for determining when the weighting factors have converged to values which allow the neural network to emulate the signal processing function with acceptable error; and
programmable means for applying the weighting factors to the receiving means to enable the neural network to emulate the plurality of nonlinear signal processing functions,
wherein the system is a color video signal processing system which produces at least first and second color signal values as respective first and second output values in both the simulated and desired output vectors, and the cost function is a function of a difference between a ratio of the simulated first and second output values and a ratio of the desired first and second output values.

11. A signal processing system having a plurality of parameter inputs comprising:
a neural network for emulating a plurality of nonlinear signal processing functions, the neural network having a plurality of input terminals for receiving a plurality of input signals; a plurality of output terminals for providing a plurality of output signals; and receiving means for receiving a plurality of programmable weighting factors, wherein the programmable weighting factors are changed on-line each time a significant change is made in one of the plurality of parameter inputs; and
means for storing a plurality of sets of predetermined programmable weighting factors, each set corresponding to a respectively different set of values for the plurality of parameter inputs;
on-line training means for determining on-line a set of weighting factors for a new set of parameter settings for which no set of weighting factors exists, said determined weighting factors being a function of at least one of the stored sets of weighting factors, the on-line training means comprising:
means for determining which one of the stored sets of weighting factors is to be used as initial values during training;
means for training the neural network as a function of the initial values to determine weighting factors for the new set of parameter settings, wherein the means for training comprises:
simulator means for simulating a response of the neural network to each of the input vectors of the test patterns to produce a vector of simulated output values;
means for calculating a plurality of cost function values, each cost function value representing a mathematical function of selected ones of the simulated output values and corresponding desired output values from the desired output vector;
back propagation means, responsive to the cost function values, for modifying each of the programmable weighting factors to minimize the cost function values; and
means for determining when the weighting factors have converged to values which allow the neural network to emulate the signal processing function with acceptable error; and programmable means for applying the weighting factors to the receiving means to enable the neural network to emulate the plurality of nonlinear signal processing functions, wherein the system is a color video signal processing system which produces at least first and second color signal values as respective first and second ones of both the simulated and desired output values, and the cost function is a function of a combination of the first and second simulated output values and the first and second desired output values which represents a difference between a first luminance value produced by the simulated output values and a second luminance value produced by corresponding desired output values.

* * * * *